United States Patent [19]

Smith

[11] Patent Number: 5,548,433
[45] Date of Patent: Aug. 20, 1996

[54] OPTICAL CLOCK RECOVERY

[75] Inventor: Kevin Smith, Woodbridge, England

[73] Assignee: British Telecommunications public limited company, London, England

[21] Appl. No.: 325,360

[22] PCT Filed: Apr. 26, 1993

[86] PCT No.: PCT/GB93/00863

§ 371 Date: Nov. 8, 1994

§ 102(e) Date: Nov. 8, 1994

[87] PCT Pub. No.: WO93/22855

PCT Pub. Date: Nov. 11, 1993

[30] Foreign Application Priority Data

Apr. 27, 1992 [EP] European Pat. Off. .............. 92303786

[51] Int. Cl.$^6$ ............................ H04B 10/12; H04B 10/17
[52] U.S. Cl. ............................ 359/158; 359/179; 359/188; 359/341; 359/349; 372/18; 372/26; 372/28; 372/32
[58] Field of Search .................... 359/158, 174, 359/176, 179, 181, 183, 188, 340–341, 346, 349; 372/18, 32, 26, 28, 30, 29

[56] References Cited

U.S. PATENT DOCUMENTS

| | | | |
|---|---|---|---|
| 3,586,997 | 6/1971 | Kinsel | 359/340 |
| 4,845,719 | 7/1989 | Kitahara | 372/26 |
| 4,864,577 | 9/1989 | Aoshima | 372/30 |
| 5,056,096 | 10/1991 | Baker | 359/341 |
| 5,267,256 | 11/1993 | Saruwatari | 372/94 |
| 5,365,531 | 11/1994 | Lin | 372/18 |
| 5,369,520 | 11/1994 | Avramopoulos | 359/158 |
| 5,392,147 | 2/1995 | Kaede | 359/187 |
| 5,398,111 | 3/1995 | Cardarelli | 372/32 |
| 5,416,865 | 5/1995 | Fielding | 359/341 |

FOREIGN PATENT DOCUMENTS

| | | | |
|---|---|---|---|
| 3005592 | 3/1993 | WIPO | 359/188 |

OTHER PUBLICATIONS

Smith et al, "Totally Integrated Erbuim Fibre Soliton Laser Pumped By Laser Diode", Electronics Letters, vol. 27, No. 3, 31 Jan. 1991, Stevenage GB, pp. 244–246.

Barnsley et al, "Clock Extraction Using Saturable Absorption in a Semiconductor Nonlinear Optical Amplifier", IEEE Photonics Technology Letters, vol. 3, No. 9, Sep. 1991, New York US, pp. 832–834.

Jinno et al, "All-Optical Timing Extraction Using a 1.5 μm Self Pulsating Multielectrode DFB LD", Electronics Letters, vol. 24, No. 23, 10 Nov. 1988, Stevenage GB, pp. 1426–1427.

Smith et al, "All-Optical Clock Recovery Using A Mode-Locked Laser", Electronics Letters, vol. 28, No. 19, 10 Sep. 1992, Stevenage GB, pp. 1814–1816.

Blow et al, "WO-Wavelength Operation of the Nonlinear Fiber Loop Mirror", 1990 Optical Society of America, pp. 248–250.

Blow et al, "Demonstration of the Nonlinear Fibre Loop Mirror as an Ultrafast All-Optical Demultiplexer", Electronics Letters, 5 Jul. 1990, vol. 26, No. 14, pp. 962–963.

Nelson et al, "All-Optical Gbit/s Switching Using Nonlinear Optical Loop Mirror", Electronics Letters, 25 Apr. 1991, vol. 27, No. 9, pp. 704–705.

Primary Examiner—Leslie Pascal
Attorney, Agent, or Firm—Nixon & Vanderhye P.C.

[57] ABSTRACT

A system for recovering a clock from an optically encoded signal uses a mode-locked laser. A modulator is connected in common with the laser cavity of the laser and a transmission path applies the input optically encoded signal to the modulator. The modulator in response to the optically encoded signal modulates the phase and/or amplitude of light in the laser cavity thereby locking the phase and frequency of an output pulse stream to the timing wave of the optically encoded signal. In a preferred example, the modulator is a non-linear optical modulator used for cross-phase modulation (XPM) of the light in the laser cavity.

24 Claims, 6 Drawing Sheets

— PERIODIC
--- RANDOM

OPTICAL CLOCK RECOVERY

FIELD OF THE INVENTION

The present invention relates to the recovery of a clock signal from a data stream, and in particular to an all-optical system for carrying out such a function. The invention also encompasses a novel mode-locked laser.

In this specification the term "optical" is intended to refer to that part of the electromagnetic spectrum which is generally known as the visible region together with those parts of the infra-red and ultraviolet regions at each end of the visible region which are capable for example of being transmitted by dielectric optical waveguides such as optical fibres.

BACKGROUND ART

Clock or timing recovery circuits have the purpose of extracting a timing wave at the symbol rate from a conditioned signal pulse stream. Once recovered, such a timing wave might then be used, for example, to clock subsequent signal processing stages for the pulse stream. The present invention is particularly concerned with the case where the original data stream is in the form of a modulated optical signal, as might be found, for example, in an optical telecommunications system. Hitherto, in order to recover a clock signal from such an optical data stream the optical signal has been converted from the optical to the electronic domain using e.g. a photodetector, and the electronic signal subsequently filtered to derive the timing wave. Since the bandwidth of the electronic circuitry is inevitably far smaller than that of the optical circuits, this clock recovery stage acts as a bottle-neck, limiting the performance of the system of which it forms a part.

SUMMARY OF THE INVENTION

According to a first aspect of the present invention, there is provided a system for recovery of a clock from an optically encoded signal comprising:

a mode-locked laser;

a modulator in the optical path of the optical cavity of the mode-locked laser;

means for applying an optically encoded input signal to the modulator; and means for outputting an optical pulse stream from the mode-locked laser;

the modulator in response to the optically encoded signal modulating the phase and/or amplitude of light in the optical path of the laser cavity thereby locking the phase and frequency of the output pulse stream to the timing wave of the optically encoded signal.

The present invention provides an all-optical clock recovery system, suitable for use with an RZ pulse stream. A laser is mode-locked via a modulator driven by the optical stream of data. This results in the generation in the laser of a pulse stream corresponding to the timing wave of the optical signal applied to the modulator. This all-optical system can operate at data rates as high as 100 GHz, far above the rates attainable with conventional electronic clock recovery circuits. Moreover the resulting pulse stream can be employed directly in further optical processing applications, without requiring an additional electro-optical conversion stage. It is suitable for use therefore with optical multiplexing, regeneration and memory access circuits.

Preferably the output pulse stream is used to clock a subsequent optical processing stage for the optically encoded signal.

Preferably the modulator is a non-linear optical modulator (NOM) connected in common with an optical transmission path for the optically encoded signal and with the laser cavity.

Preferably, the laser cavity includes a passive signal shaping element.

The inclusion of a passive shaping element in the cavity makes the output pulse stream more robust, and less susceptible to variations in the modulating data.

Preferably the modulator is arranged as a cross-phase modulator (XPM).

Preferably the mode-locked laser is a fibre laser. The use of a fibre laser is particularly advantageous in facilitating integration of the system with optical fibre-based transmission systems. Preferably the active medium of the mode-locked laser serves as part of the optical transmission path for the optically encoded signal, thereby amplifying the signal.

The configuration adopted for this preferred aspect of the invention, using a fibre laser with a part of the laser cavity serving also as a transmission path for a modulating signal, offers significant advantages over conventional mode-locked lasers and is not limited in application to the system for clock recovery of the first aspect of the invention.

A clock recovery circuit in accordance with the first aspect of the invention can advantageously form the basis of an all-optical signal regenerator, capable of operating at high data rates.

According to a second aspect of the present invention, there is provided a regenerator for an optical signal comprising, in combination, a clock recovery system in accordance with the first aspect of the present invention, and a modulator circuit connected to the output of the clock recovery system and to a source of a data carrying signal and arranged to produce a modulated signal substantially aligned to the timing of the clock signal.

Preferably the modulator circuit comprises:

a first optical signal path carrying the optical signal;

a second optical signal path carrying the clock signal output from the clock recovery system; and a non-linear optical medium connected in common to the first and second optical signal paths, the clock signal pumping the medium thereby cross-phase modulating the optical signal and substantially aligning the timing of the optical signal to the clock signal.

Preferably, the non-linear optical medium in the modulator circuit is a fibre modulator. Preferably, the fibre modulator is connected to the first and second optical signal paths in a loop mirror configuration.

The use of a loop mirror configuration in a clock recovery circuit, or in a regenerator stage following a clock recovery circuit, is particularly advantageous in that it provides a circuit with a high degree of immunity to the effects of vibration or other physical disturbance. In the loop mirror interference between signals travelling around the loop in opposite directions converts the phase shifts into amplitude modulation.

According to a third aspect of the present invention, there is provided a mode-locked laser system comprising:

a fibre laser;

means for pumping the fibre laser;

a fibre modulator connected in the path of the optical cavity of the fibre laser and connected in common with an optical transmission path for a driving signal; and means for outputting an optical pulse stream from the laser;

the driving signal modulating the phase and/or amplitude of light in the optical path of the laser cavity, thereby mode-locking the laser.

According to a fourth aspect of the present invention, there is provided a method of recovering a clock from an optically encoded signal, including the step of driving a modulator in a mode-locked laser with the optically encoded signal thereby generating in the laser a pulse train locked in phase and frequency to the timing wave of the optically encoded signal.

DESCRIPTION OF THE DRAWINGS

Embodiments of a system for optical clock recovery in accordance with the present invention will now be described in detail, by way of example only, with reference to the accompanying drawings, in which.

DETAILED DESCRIPTION OF EXAMPLES

Figure 1:
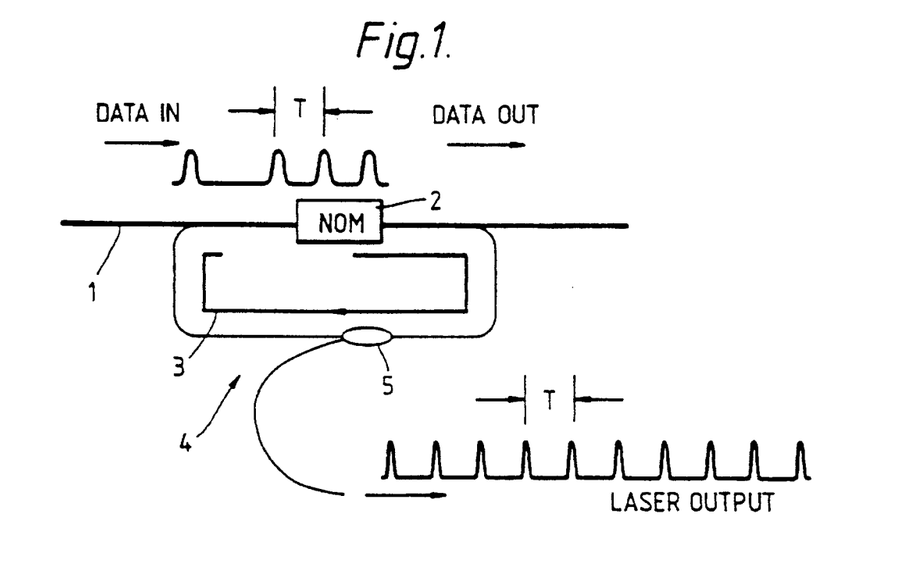
FIG. 1 is a diagram illustrating a clock recovery circuit.

FIG. 1 shows the basic configuration of one example of a system embodying the present invention. An optical signal encoded with data in the form of an RZ pulse stream is carried through the system in a transmission fibre 1. A non-linear optical modulator (NOM) 2 is connected in the path of the signal in the transmission fibre. The NOM 2 is also connected in the optical path of the laser cavity 3 of a mode-locked laser 4. The laser generates a pulse train locked to the timing waveform of the input data. The pulse train is output via an output coupler 5.

Figure 3A:
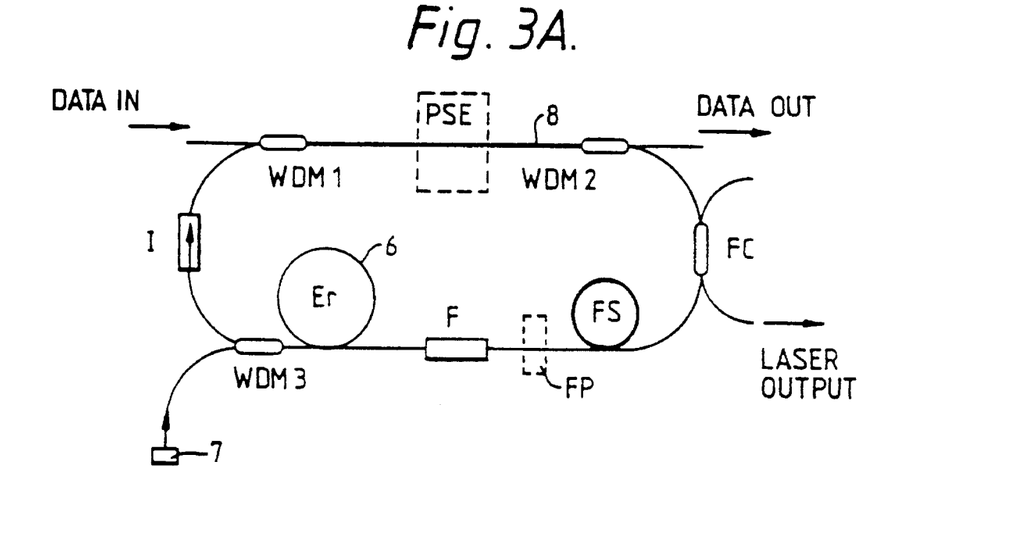
FIGS. 3A and 3B show two alternative examples of all-optical clock recovery circuits.
Figure 5:
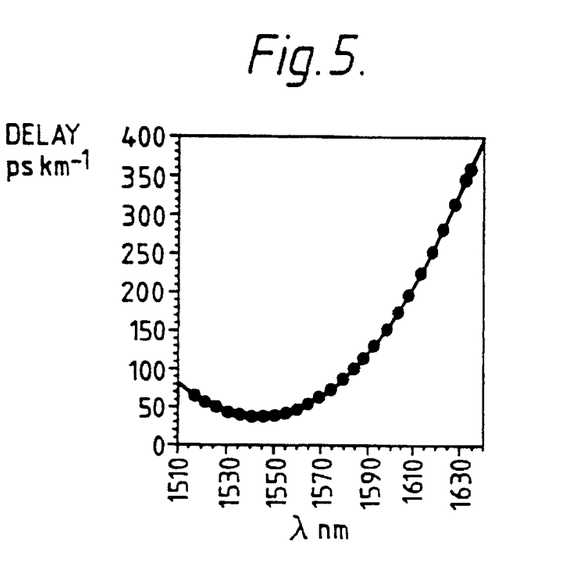
FIG. 5 is a delay characteristic for a fibre modulator.

FIG. 3A shows in detail a first example of a clock recovery circuit. In this example, the mode-locked laser is a fibre laser 6, incorporating a fibre modulator 8 in the optical cavity. The fibre modulator 8 is connected in common with the optical cavity and the transmission system associated with the circuit. It comprises a single-mode optical fibre, which, in the present example, has a length of 8.8 km. A suitable fibre is available commercially under the trade name SMF/DS CPC3 from Corning Inc., a U.S. corporation of Corning, N.Y. 14831. This is a dispersion-shifted fibre designed to operate in the 1550 nm region. It has a mode field diameter of 8.1 microns, a cladding diameter of 125 microns and a coating outside diameter of 250 microns. The effective group index of refraction is 1.476 at 1550 nm. The dispersion characteristics are shown in FIG. 5. They are such that the dispersion minimum falls between the wavelengths of the data and of the laser cavity.

The length needed for the fibre modulator is determined by the required phase shift. In general, the phase shift need not be as big as $\pi$. The phase shift is proportional to the product of the peak power and the interaction length, so that there is a trade-off between these two. The selected length of 8.8 km makes it possible for the modulator to function at peak powers less than 10 mW, e.g. 5 mW. If the power is increased to 100 mW, then the required length comes down by a corresponding factor of 100. In general, for passive mode-locking of the laser cavity by the data stream to be effective, a phase shift of 0.3 radians in the fibre modulator is sufficient.

Wavelength-selective couplers WDM1 and WDM2 couple the ends of the fibre modulator 8 to the transmission system and to the rest of the laser cavity.

Figure 6:
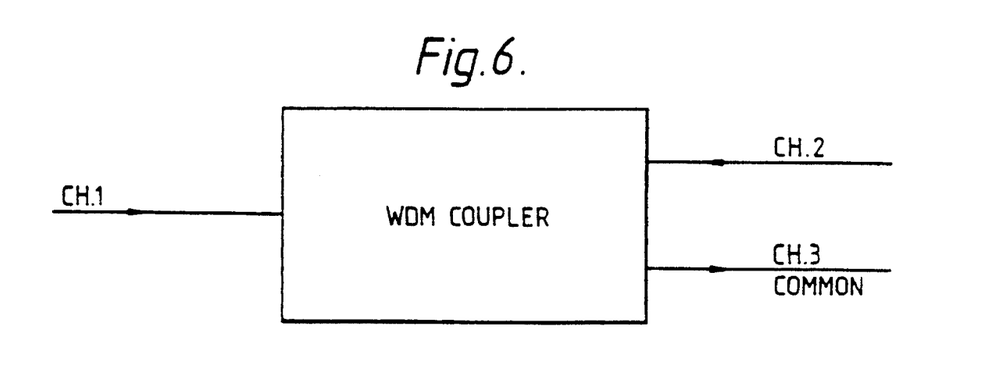
FIG. 6 is a diagram showing schematically a wavelength-selective coupler.

Each of the couplers WDM1, WDM2 is a bi-directional device incorporating an interference filter formed as an evaporation-deposited stacked dielectric. One wavelength passes straight through the filter while another wavelength is reflected. FIG. 6 is a diagram showing schematically the input and output channels. Channel 1 is a channel in a wavelength range from 1.535 to 1.541 microns. Channel 2 is a channel at 1.555 to 1.561 microns. Channel 3 is an output channel common to both wavelength ranges. An appropriate device having these properties is available commercially from the company JDS FITEL as WDM coupler model number WD1515Y-A1. A similarly constructed wavelength-selective coupler WDM3 is used to couple the laser diode pump to the fibre laser 6. This has Channel 1 transmitting an input at 1.468 to 1.496 microns and Channel 2 transmitting at 1.525 to 1.580 microns. This WDM coupler is available commercially as WD141F-M2 also from JDS FITEL.

In operation, different wavelengths corresponding to the different channels of the couplers WDM1 and WDM2 are chosen for the laser and for the data. The two couplers (WDM1, WDM2) then allow the data stream to pass straight through the clock recovery circuit via the common fibre, while permitting the laser wavelength, which is defined by the spectral filter F, to be coupled around the simple ring laser configuration. The filter F in this example is an interference filter. The peak wavelength and transmission peak width of the filter can be varied by altering the angle of the filter element with respect to the incident beam. The bandwidth of the filter F may be used to control the laser pulse width.

The fibre laser 6 is based on an erbium-doped fibre (operating range 1.52–1.6 μm) pumped by a high-power laser diode (LD). Both signal and laser wavelengths in this example lie within the erbium fibre gain window as in currently proposed all-optical non-linear fibre loop (de)multiplexing schemes (Nelson, B. P., Blow, K. J., Constantine, P. D., Doran, N. J., Lucek, J. K., Marshall, I. W., and Smith, K.: "All-optical Gbit/s switching using nonlinear optical loop mirror", Electron. Lett., 27, p. 704 (1991)). The erbium fibre laser employs an $AL_2O_3$-$GeO_2$-$SiO_2$ host with an erbium doping level of 200–300 ppm, a core diameter of 5.4 μm and an index difference of 0.01. A suitable erbium fibre laser is described in Smith, K., Greer, E. J., Wyatt, R., Wheatley, P., Doran, N. J., and Lawrence, M.: "Totally Integrated Erbium Fibre Soliton Laser Pumped by a Laser Diode", Electron. Lett., 1991, 27, p.244.

The laser is pumped by a laser diode 7. This may be a GRINSCH InGaAsP device as described in the above cited paper by Smith et al.

The circuit includes a fibre stretcher FS which is used to facilitate fine adjustment of the cavity length and to ensure that the cavity round-trip time is matched to an exact multiple of the data rate. The fibre stretcher may comprise a pair of cylindrical drums around which part of the fibre forming the optical cavity is wound. The drums may then be driven apart, for example by a piezo-electric element, to stretch the fibres. Alternatively, the fibre may be wound round a single expansible cylinder of piezo-electric material. The cylinder then expands in response to an applied control signal in order to stretch the fibre.

The fibre stretcher may be used in a feedback loop to stabilize the mode-locked laser. Part of the signal in the laser loop is split and fed to a phase-sensitive detector which compares the phase of the signal with a fixed reference signal. The resulting error signal is fed back to the piezo-electric element of the fibre stretcher so as to correct any variations. Since both the fibre modulator and the circuit as a whole are temperature sensitive, the stability of this circuit may be further optimized by placing the entire circuit within a sealed thermally-insulated housing. Thermostatic control of the temperature of the circuit environment may also be provided where necessary.

The cavity incorporates an intra-cavity fibre isolator I which ensures that the cavity functions unidirectionally and allows the full laser power to be accessed in a single stable pulse train via the output coupler 5. This coupler is a fused fibre device available commercially from BT & D Technologies, model number SMC0202-155-OC. The fibre isolator I is available commercially from BT & D Technologies with model number OIC-1100-1550.

Figure 3B:
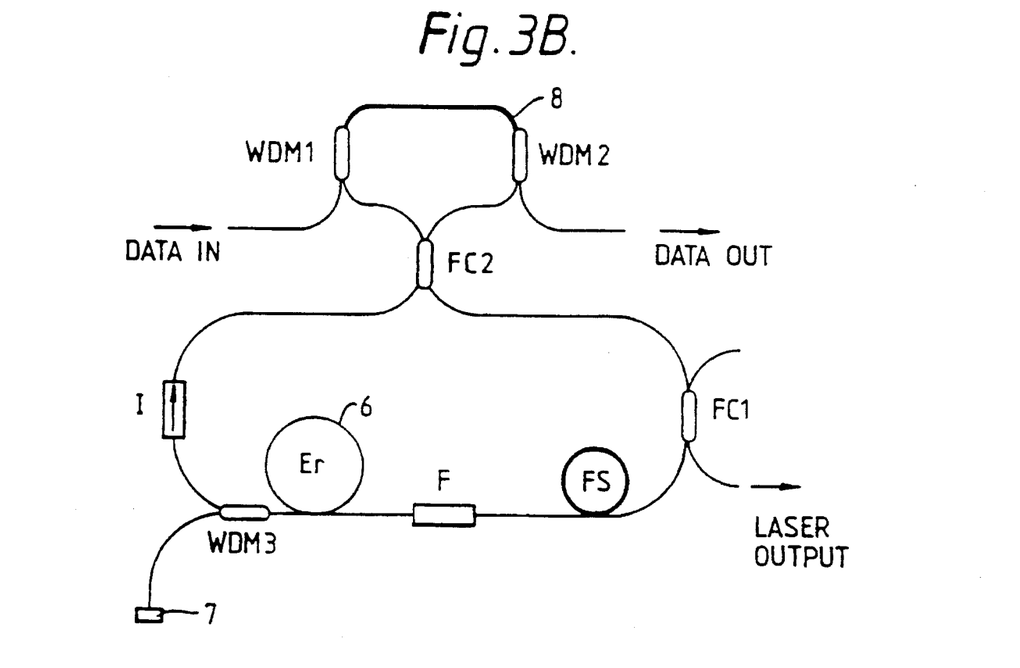

A further example of a clock recovery circuit is shown in FIG. 3B which is similar to the first circuit but utilises a two-wavelength non-linear loop mirror to act as an amplitude modulator for the laser cavity. In this case, the shared fibre (again between WDM1 and WDM2) forms part of the non-linear loop and hence the phase modulation is converted to amplitude modulation.

The circuit configurations described above, as well as being particularly suitable for clock recovery, can also be used more generally for applications requiring a mode-locked laser. In place of the input data stream a dedicated driving signal may be generated and input to the fibre modulator. The frequency of the driving signal is chosen in accordance with the characteristics of the laser cavity and the desired output pulse stream.

Although the circuit configuration and components described above are preferred for their ease of integration with current and proposed fibre transmission systems, other components and configurations are possible as alternatives. As an alternative to an erbium-doped fibre laser, a praesodynium doped fibre laser may be used. Such a laser operates in the region of 1.3 microns. Accordingly, a circuit using such a laser may be advantageous where it is desired to translate pulses from the 1.5 micron transmission window to the 1.3 micron region. To this end, such a circuit might be used in combination with an all-optical regenerator as described further below. One possible modification to the FIG. 3A circuit is the addition of a Fabry-Perot filter FP, shown in dashed lines. This provides a narrow-band filter tuned to stop the laser jumping in wavelength.

As an alternative to the use of wavelength-selective devices for the couplers, the data signal and the pump signal may be distinguished by different polarisation states in which case polarisation splitters PDM are used in place of the wavelength-selective devices. An appropriate fibre modulator could be formed using a birefringent fibre. This is a fibre including stress centres to give an anisotropic refractive index. If light polarised parallel to one of the fibre axes is launched along that axis, then it maintains its polarisation state. Such fibres typically introduce a delay of 1 ps/m and so over a long length this would result in separation of the data and the laser pulse stream. Accordingly, where long fibre lengths are used, the overall length may be constructed from two shorter lengths coupled end to end, with a relative shift in the orientation of the fibres so as to cancel out the effects of the delay. For shorter lengths, e.g. 10 meters or less, this is unnecessary and a single length of birefringent fibre may be used to form the fibre modulator.

Figure 7:
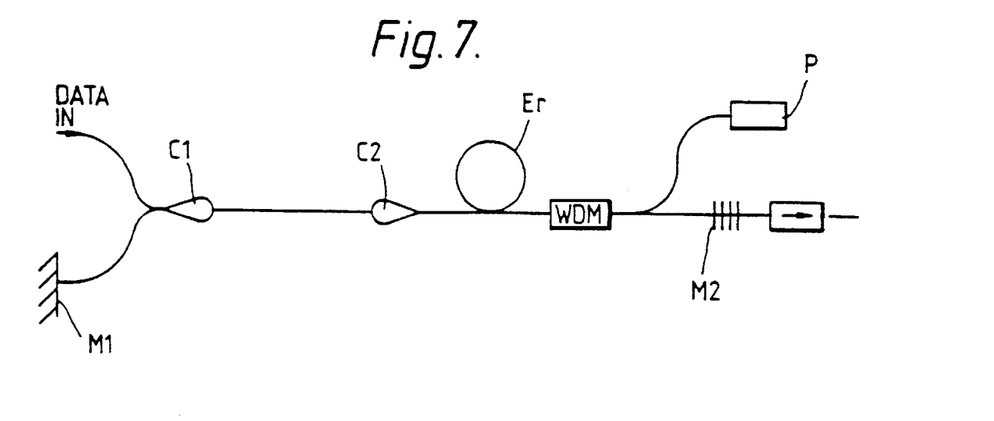
FIG. 7 is a diagram showing an alternative linear laser cavity circuit.

The mode-locked laser need not be a ring laser as in the circuits previously described, but may alternatively use a linear laser cavity as shown in FIG. 7. Such a cavity would typically be formed between two termination mirrors M1,M2 or between a termination mirror and a reflective output coupler/filter. Such a reflective filter may be based on a fibre grating produced by optical writing into a photosensitive fibre. This grating would then combine the functions of the output coupler FC and the filter F described in the above circuit. In the Figure, P is the pump, C1 and C2 fibre couplers and Er the erbium laser.

The modulator need not be a fibre modulator of the type described above, and in principle any suitable non-linear material may be used. Particularly appropriate may be a capillary waveguide filled with an organic non-linear liquid such as $CS_2$. Such a device gives a non-linearity as much as 100 times greater than a fibre modulator, although at the cost of a greater response time, typically of the order of 1 ps.

Further alternatives for the modulator are provided by semiconductor doped glasses, semiconductor device waveguides and semiconductor laser amplifiers operating at their transparency point (i.e. with gain=1). These are found to be particularly fast and have a response time less than 1 ps.

Figure 8:
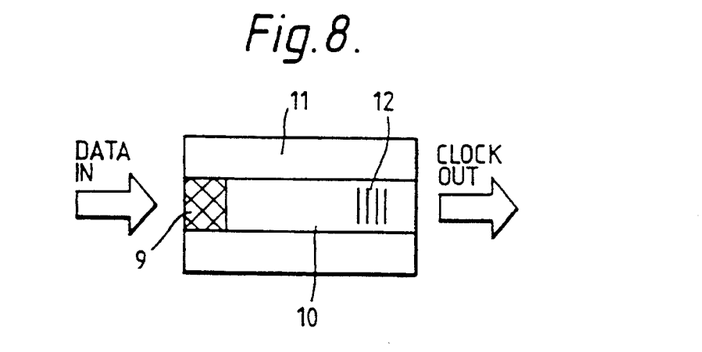
FIG. 8 is a diagram showing a recovery circuit implemented as a semiconductor device.

The entire clock recovery circuit may be implemented in an integrated semiconductor device including a saturable absorber 9 which is pumped by the optical signal, and an associated semiconductor laser gain medium 10. The gain medium is formed in a channel in a semiconductor substrate 11. A Bragg filter 12 would then be formed in the semiconductor structure to tune the device to a required wavelength. An appropriate structure is shown schematically in FIG. 8.

Irrespective of the particular components or configuration chosen, the method utilises the incoming data stream to drive or "pump" a mode-locked laser, which in turn generates short, picosecond duration pulse trains at the base rate (or an exact multiple) of the data. The data serves to modulate either the amplitude or phase of the light in the laser cavity. Providing this modulation takes place with a period (T) equal to (or an integer multiple of) the laser round-trip time, mode-locking of the laser follows (Siegman, A. E.: Chapter 7 of "Lasers", University Science Books, Mill Valley, Calif., (1986) and references therein). The ensuing stream of pulses (at a repetition rate 1/T) can be accessed via the output coupler.

Figures 2A, 2B:
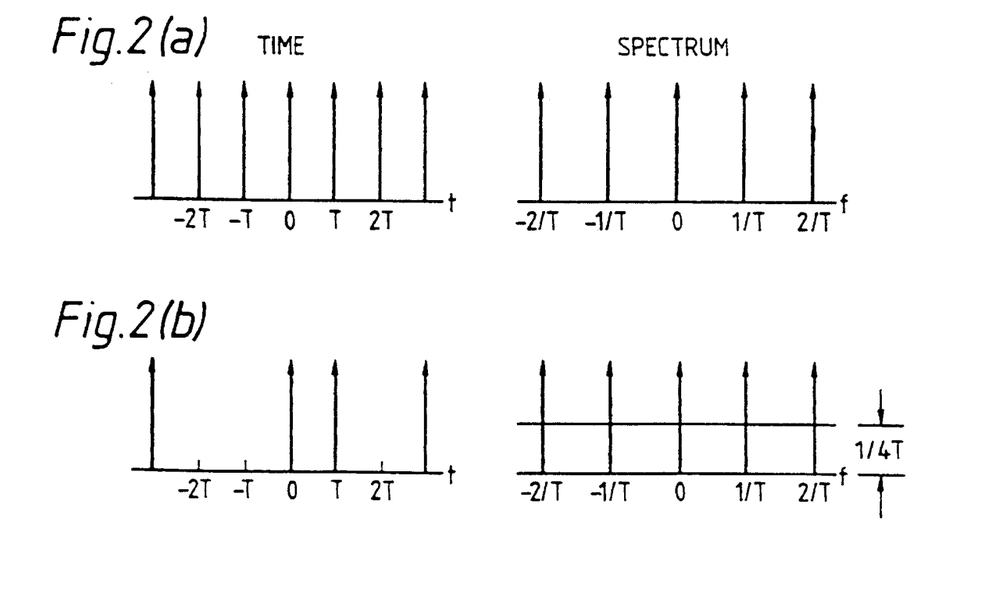
FIGS. 2A and 2B show the time domain picture and corresponding power spectrum for a periodic train of impulses and a random train of impulses respectively.

The mode-locking laser can conveniently be analysed as follows. For a linear laser cavity of length, L, the adjacent axial modes are spaced by (c/2nL) where c is the velocity of light in free space and n is the refractive index of the cavity medium. (For a ring laser the axial mode spacing is c/nL.) These modes oscillate independently with randomly varying phases and amplitudes and consequently the output of the laser will vary in an uncontrolled manner. In the case of mode-locking, a modulator (either phase or amplitude) is placed within the laser cavity and driven at the axial mode frequency separation. A periodic modulation (period, T) gives rise to a set of frequency sidebands separated by 1/T. This is illustrated in FIG. 2A where we show a period train of impulses in time (specifically a periodic array of delta functions, $y(t)=\Sigma\delta(t-nT)$) and the corresponding frequency power spectrum. If the 1/T frequencies coincide with the axial laser modes, then these modes are forced to have a definite phase relationship with each other. In this case, the output of the mode-locked laser has the following characteristics:

(i) The pulse repetition frequency is c/2nL for a linear cavity (c/nL for a ring).

(ii) For N locked oscillating modes of equal amplitude the width of the pulses is given by $1/\Delta\upsilon$, where $\Delta\upsilon$ is oscillation linewidth of the laser.

(iii) The peak power is N times the average laser power without mode-locking.

In practice, for the circuits using fibre lasers we employ "harmonic mode-locking". The idea behind this is essentially as described above, but now the driving frequency is tuned to a high ($N^{th}$) harmonic of the cavity frequency i.e. $1/T=N\times(c/2nL)$. The laser modes therefore become organised into N more or less independent sets of coupled modes. This method is commonly applied to fibre lasers since long overall cavity lengths (typically tens of meters) are required to obtain sufficient gain for laser action and, therefore, the associated fundamental frequencies are only ~MHz.

The modulating signal can be considered to be a random train of impulses such as those depicted in FIG. 2B. The data sequence is not completely random since the pulse arrival times are defined by T. In this case, the pulse train can be represented by $y(t)=\Sigma a_n\delta(t-nT)$ where $a_n$ is either 1 or 0. The corresponding power spectrum can be calculated (Kanefsky, M.: Chapter 2 of "Communication Techniques for Digital and Analog Signals", Harper & Row (1985)) and is also shown in FIG. 2B. It is similar to that of the periodic impulse sequence in FIG. 2A but with the addition of a white noise component. As we can see, providing that we ensure that the axial mode-spacing coincides with the 1/T data rate, the periodic modulation can serve to couple the cavity modes and thereby mode-lock the laser. We also note that by tuning the laser length such that the 1/T data period coincides with sub-multiples of the axial mode spacing, we can force the laser to oscillate at integer multiples of the data rate.

The basic mode-locking mechanism for the systems described here is that of XPM. This effect occurs because the effective refractive index of a wave depends not only on the intensity of that wave but also on the intensity of other copropagating waves. We imagine that the data stream, at a wavelength $\lambda_S$, modifies the refractive index periodically for the second (laser) wavelength at $\lambda_L$. We can easily estimate the magnitude of this effect. If we assume that the group delays of the two wavelengths are closely matched, then the phase change, $\Delta\Phi$, imposed by the pump wavelength upon the "weak" signal can be calculated from the following:

$$\Delta\Phi = \frac{4\pi}{\lambda}\left[\frac{n_1PL}{A_{\mathit{eff}}}\right]$$

where $n_2$ is the non-linear (Kerr) coefficient ($=3.2\times10^{-20}$ m²/W), $A_{\mathit{eff}}$ is the effective fibre core area, $\lambda$ is the wavelength, P is the peak power of the optical "pump" pulse, and L is the length of the shared fibre link. As an example, taking an effective area of 50 µm², L~1 km, and a wavelength of 1.55 µm, we can calculate a peak power, P~600 mW for $\Delta\Phi=\pi$. In terms of a non-linear loop mirror modulator, this gives rise to a 100% amplitude modulation. In general, however, this strength of modulation is well in excess (by approximately an order of magnitude) of that required for good, stable mode-locking (Siegman, A. E.: Chapter 7 of "Lasers", University Science Books, Mill Valley, Calif. (1986) and references therein). We can therefore infer that peak powers ~60 mW should be sufficient. The above equation applies to a pump and signal with the same linear polarization state. In the real world, the peak power estimate may be increased by a factor ~1.5 by the evolution of the relative pump and signal polarizations. These peak powers can readily be achieved by incorporation of fibre amplifiers within the proposed optical circuit. If the link length were to increase to, say, 5 km then soliton pulses in all-optical systems may perform the modulation directly (e.g. for 25 ps duration pulses in fibre with a dispersion constant D of around +1 ps/nm.km fibre, the path average power for the fundamental soliton, $P_1$~5 mW).

Figure 4:
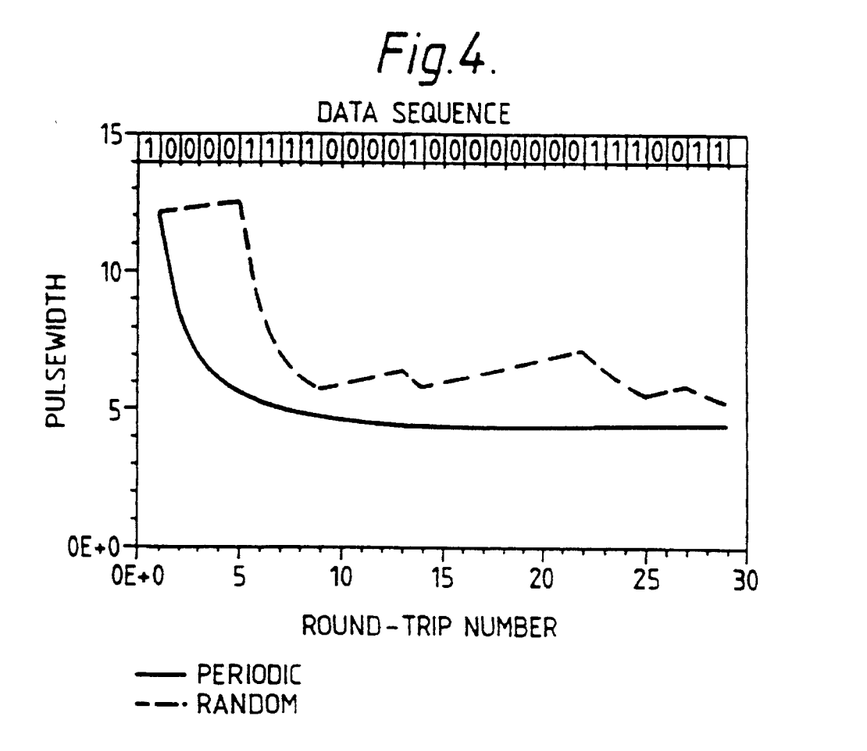
FIG. 4 is a graph illustrating the evolution of the laser from a DC field input for a periodic pump pulse train and for a random data pulse train.

An important characteristic of the clock recovery circuit is the time required for the circuit to respond to the incoming data stream—the "lock-up" time. In the case of a mode-locked laser, this will be determined by the number of round-trips required to establish the mode-locked train, together with the round-trip time of the cavity. We can estimate the number of round-trips required by employing the transient analysis of active mode-locking described by Kuizenga and Siegman. According to their analysis, the number of round-trips, $N_{ss}$, required to form a pulse width within ~20% of the final steady state value is given by $$N_{ss}=\{8\ G_0\ \Delta_m\}^{-1/2}\ [\Delta f_a/f_m]$$

where $G_0$ is the steady state gain coefficient, $\Delta_m$ is the depth of modulation, $\Delta f_a$ is the cavity bandwith and $f_m$ is the modulation frequency. Taking typical values for our laser configuration of $G_0$~1.5, $\Delta_m$~2,$\Delta f_a$~100 GHz (~1 nm) and $f_m$~2 GHz we estimate $N_{ss}$ to be ~10. Therefore, for a cavity length of 1 km, the lock-up time would appear to be ~50 µs. By employing shorter cavity lengths, say ~100 m, this time is reduced to a few µs. These estimates have been verified by some simple numerical computer simulations. We consider the idealised case in which the laser is initially oscillating in only a single axial mode at the time the amplitude modulator is first turned on. The cavity also contains a simple spectral filter which serves to limit the final pulse duration. The results are plotted in FIG. 4 where we show the evolution of the pulse width (arbitrary units) vs. round-trip number for both a truly periodic pumping sequence (full curve) and a "random" sequence (dashed curve). The full curve shows that the pulse width is close to its final value within ~10 round-trips which is in good agreement with the predictions of Kuizenga and Siegman. In the case of the dashed curve we use the same laser parameters as for the full curve, but on every cavity round-trip we use a random number generator to select whether the modulator is "on" (1) or "off" (0). We can see that a "1" serves to compress the mode-locked pulse, while a "0" leads to a pulse broadening due to the sole action of the filter. According to these simple computer simulations, the effect of using a random data sequence mode-lock on the laser is two-fold: Firstly, there is a mechanism for laser pulse width variations, and secondly, the resultant average pulse width generated is somewhat broader than the truly periodic modulation case. It appears, however, that the circuit lock-up time with a "random" pump is comparable to that of the simple mode-locked laser. It is worth noting that the actual number of cavity round-trips required to form the mode-locked pulse is relatively small (only ~10's). As a consequence, in terms of the lock-up time, advantages are gained by using short cavity lengths. For fibre lasers, the use of highly doped fibres facilitates cavity lengths ~10's of cm with associated nanosecond lock-up times. In the case of an Erbium laser, for example, doping levels might be increased to around 4000 ppm, an order of magnitude greater than the 200–300 ppm doping levels conventionally adopted. To accomplish this we would also require highly non-linear shared links and fibre modulators. Potential candidates for these links are semiconductor doped fibres or semiconductor laser amplifiers. A suitable amplifier is described in the paper by C. T. Hultgren and E. P. Ippen: "Ultrafast refractive index dynamics in AlGaAs diode laser amplifiers", Appl. Phys. Lett. 59(6), 5.8.91. Such an amplifier would combine the functions of the fibre modulator and the laser in the circuits of FIG. 3.

A further feature of the circuits is that changes in the frequency of the incoming data signal can be tracked by adjustment of the laser cavity length. The circuits depicted in FIG. 3, as noted above, incorporate fibre stretchers from which it is reasonable to obtain length changes, $\Delta L \sim 10$ cm. We would therefore expect a corresponding change in the axial mode-spacing, $\Delta f (=c \Delta L/nL^2)$, of ~1.5 kHz for a 100 m long cavity.

Another consideration is the response of the circuit to a temporal jitter on the incoming signal. In terms of a long-distance soliton system, this so called Gordon-Haus jitter (Gordon, J. P., and Haus, H. A.: "Random walk of coherently amplified solitons in optical fibre transmission", Opt. Lett., 11, p. 665, (1986)) is the result of amplified spontaneous emission from the fibre amplifiers. Since the switching window of the all-optical modulator is determined by both the data pulse width and the group delay difference between the signal and laser wavelength, the pulse walk-through to some extent cancels out the effects of the timing jitter. As discussed further below, this effect may be exploited to enable the circuit to function as an optical regenerator.

As discussed above in relation to FIG. 4, the shape of the pulses output from the clock recovery circuit shows some dependence on the modulating data stream. In use, the fibre modulator tends to sharpen the pulses in the laser cavity, while the filter tends to broaden them. If the data stream contains a stream of zeros then during that time the modulator is not effective to sharpen the pulses and so the width of the pulses tends to increase. In a modification to the FIG. 3A circuits shown in dashed lines, a passive shaping element PSE is added to the laser cavity. This is an element which tends to sharpen the pulses, even in the absence of a modulating signal. The fibre modulator itself may provide the required passive shaping if it has non-linearities chosen to be soliton supporting at the optical powers at which the circuit operates. For the fibre modulator employed in the circuit of FIG. 3A, this is the case when the power in the laser cavity is greater than approximately 100 mW. If these non-linearities are further increased then the circuit becomes passively mode-locked, i.e. it generates output pulses even in the absence of a modulating data stream, as opposed to being passively mode-locked as in the unmodified circuits of FIG. 3. As an alternative to using the non-linearities of the fibre modulator, the passive shaping element may be an additional component formed, for example, from a non-linear semiconductor waveguide.

Figure 9:
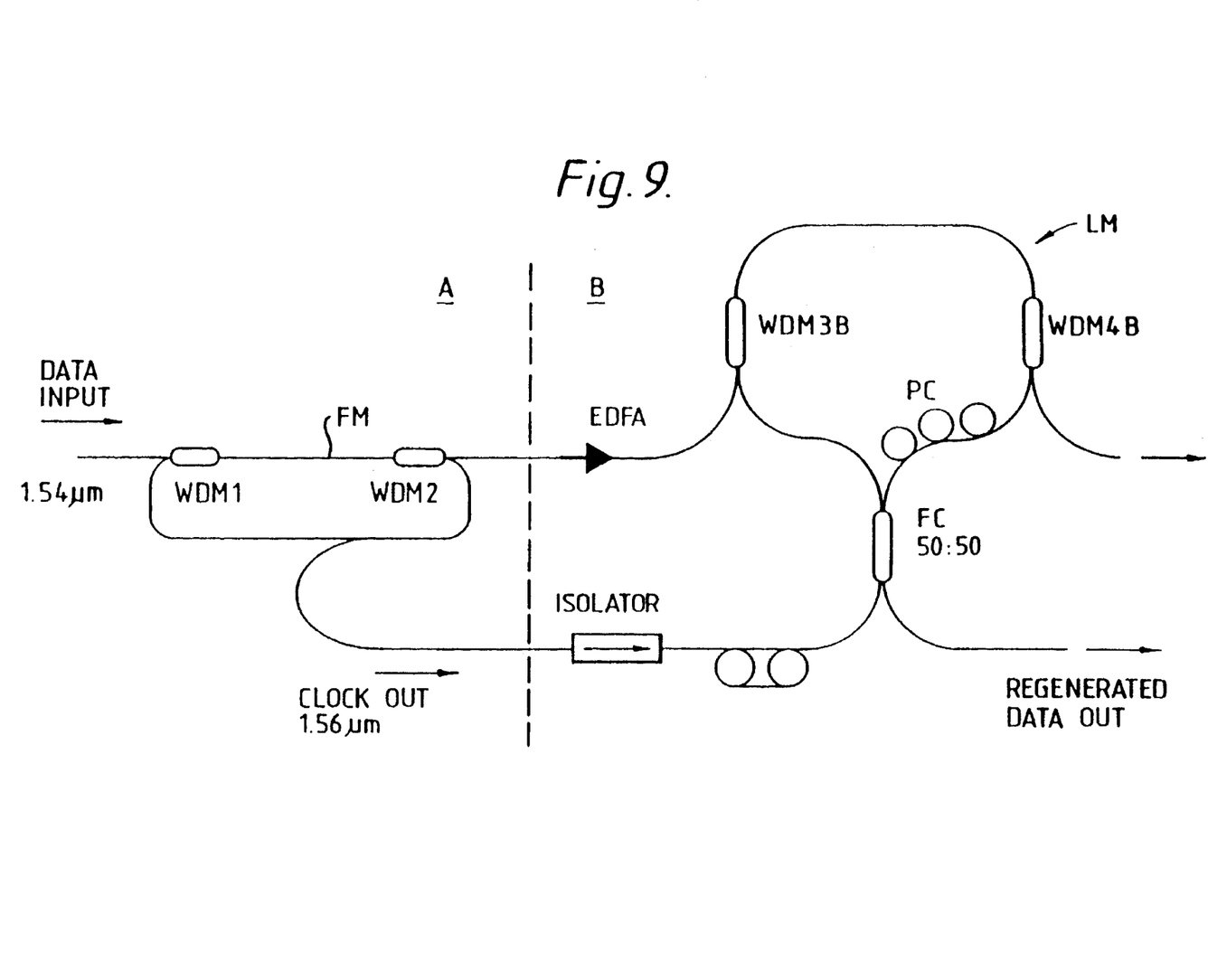
FIG. 9 is an all-optical regenerator circuit.

A clock recovery circuit in accordance with the present invention may form the basis of an all optical regenerator. Such a circuit is shown in FIG. 9. The first stage of the circuit, referenced A in the diagram, is the clock recovery circuit of FIG. 3a. The following stage, referenced B, uses a configuration similar to that adopted for the circuit of FIG. 3b and like that circuit uses a nonlinear loop mirror fibre modulator LM. This modulator uses, in the present example, 6.5 km of the same type of dispersion shifted fibre as the clock recovery circuit. As in the clock recovery circuit, the loop mirror fibre modulator is used for cross phase modulation of two signals. The first signal is the data carrying signal output from the clock recovery stage. This signal is first amplified in an erbium doped fibre amplifier EDFA before being input to the loop mirror modulator LM via a wavelength selective coupler WDM3B. The other signal is the clock output from stage A. This passes first through an isolator and a fibre stretcher and is then input to the loop mirror modulator via a 50:50 fibre coupler FCB and the two wavelength selective couplers WDM3B, WDM4B. Stage B incorporates polarisation controllers PC.

In this circuit stage B modulates the clock pulse train using the data stream in the non-linear loop mirror, so that the clock pulses become the regenerated pulse stream. Typically, the clock and the data carrying signal are at different wavelengths, 1.54 and 1.56 microns in the present example, and so this form of regeneration is particularly advantageous where translation of the signal between two wavelengths is required.

Figure 11:
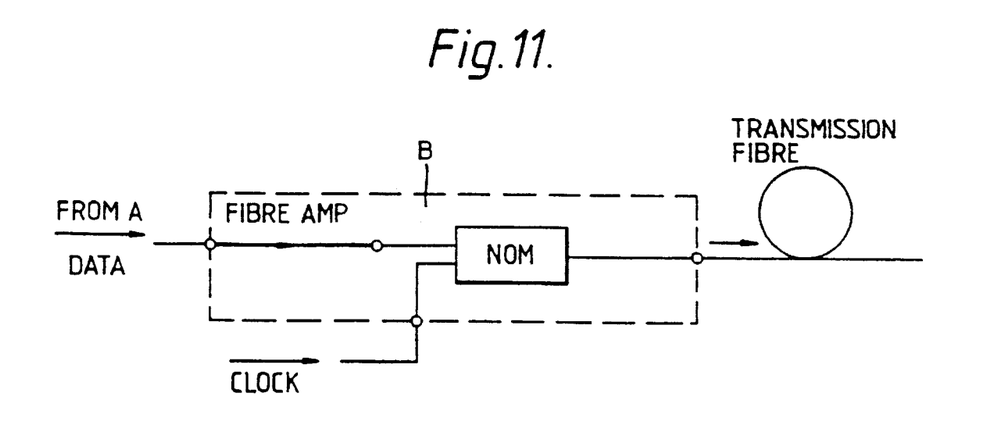
FIG. 11 is an alternative all-optical regenerator circuit.

In a second example of a regeneration circuit, the clock recovery stage is again constructed as shown in stage A of FIG. 9. Stage B however is formed as shown in FIG. 11. A modulator NOM, which may again be a fibre loop modulator, or which may alternatively be a simple length of fibre, is configured so that cross phase modulation of the data carrying signal by the clock signal peturbs the frequency of the data, in the manner described below, so that subsequent dispersion in the transmission fibre retimes the data. Neglecting the peturbation itself, the retimed data is at the same frequency as the input data and so this circuit is appropriate where a "straight through" operation, without translation between two wavelength ranges, is required.

Figure 10:
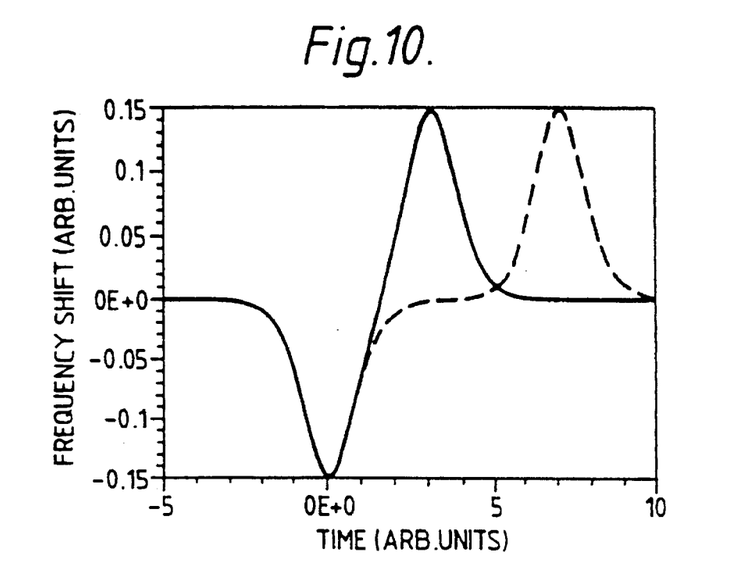
FIG. 10 is a frequency-time plot illustrating the shift in timing effected by the circuit of FIG. 11.

As already discussed above in relation to clock recovery, the interaction of the two signals in the fibre modulator results in a phase shift $\delta\Phi$ in the data carrying signal, and a corresponding frequency shift $\delta v$. The magnitude of the frequency shift is proportional to the rate of change of phase. The frequency shifts imposed on the signal are then converted into appropriate changes in timing by dispersion in the transmission fibre following the regeneration circuit. If a signal pulse arrives ahead of the centre of the time slot, then the pulse receives a net negative frequency shift. Provided that the transmission fibre is anomalously dispersive at the signal wavelength, i.e. a positive group delay dispersion, the down-shifted pulsed is slowed down and hence moves towards the centre of the time slot. Conversely, a pulse arriving late in the time window acquires a net positive frequency shift and is speeded up. The frequency shift is shown in FIG. 10, with the time shifted data shown in dashed lines. The magnitude of the frequency shift is readily controlled by adjustment of the clock pulse power. For a typical phase response time of 20 ps and a peak phase shift of π peak frequency shifts around ±/–25 GHz are obtained. Random frequency shifts in a soliton carrying transmission system arising from the Gordon-Haus effect are usually considerably smaller, typically of the order of a few MHz acquired over e.g. 5000 km of fibre path. The retiming provided by the optical regenerator is therefore more than adequate to compensate for such effects.

Other circuit configurations and different components may be used to realise the all optical regenerator. In particular, the various alternatives to the use of a loop fibre modulator discussed above in relation to the clock recovery circuit may also be adopted for stage B of a regenerator circuit.

As a further alternative approach to all-optical signal regeneration, stage A, that is the clock recovery circuit, may itself be used to produce directly the frequency shift required to retime the data. In normal operation, the clock pulses generated in the optical cavity will in turn cross-phase-modulate the data stream, producing a phase and frequency shift. In the power regimes previously discussed this effect is generally negligible, but if the laser power is increased to be as great as the power of the data carrying signal, then the magnitude of the frequency shift experienced by the data as it passes through the fibre modulator is sufficiently great to produce the required retiming when the signal subsequently undergoes dispersion in the transmission fibre. There is then no need for an additional stage such as stage B to effect signal regeneration. In this configuration the output pulse stream is the retimed data, and it is not necessary to output the pulse stream from the laser cavity.

I claim:

1. A system for recovery of a clock from an optically encoded signal comprising:
   a mode-locked laser including a cavity;
   an optically controlled optical modulator in the optical path of the optical cavity of the mode-locked laser;
   means for applying an optically encoded input signal to the optically controlled optical modulator; and
   means for outputting an optical pulse stream from the system;
   wherein the optically controlled optical modulator in response to the optically encoded signal modulates the phase and/or amplitude of light in the laser cavity thereby locking the phase and frequency of the output pulse stream to a timing wave of the optically encoded signal.

2. A system according to claim 1, further comprising an optical processing stage including an input for a clock signal and in which the output pulse stream is connected to said clock signal input to clock the optical processing stage.

3. A system according to claim 2, in which an active medium of the mode-locked laser serves as part of the optical transmission path for the optically encoded signal, thereby amplifying the signal.

4. A system according to claim 1, in which the optically controlled optical modulator is a non linear optical medium which is connected in common with an optical transmission path including the means for applying for the optically encoded signal and connected with the laser cavity.

5. A system according to claim 1, in which the mode locked laser is a fibre laser.

6. A system according to claim 1, in which the optically controlled optical modulator is arranged as a cross-phase modulator.

7. A system according to claim 1, in which the optical pulse stream and the laser cavity are tuned to different wavelengths, and the optically controlled optical modulator is coupled to the optical cavity by wavelength-selective couplers.

8. A system according to claim 1, in which the optically controlled optical modulator is a fibre modulator.

9. A system according to claim 8, in which the fibre modulator is connected in a loop mirror configuration.

10. A system according to claim 8, in which the optically encoded input signal and the optical pulse stream from the mode-locked laser are distinguished by different polarisation states, and in which the fibre modulator includes at least one length of birefringent fibre.

11. A system according to claim 10, in which the fibre modulator comprises at least two lengths of birefringent fibre coupled end-to-end with different orientations such that any differential delay between the laser pulse stream and the input signal is substantially cancelled.

12. A system according claim 1, further comprising a passive non-linear pulse-shaping element connected in the optical cavity of the mode-locked laser.

13. A regenerator for an optical signal comprising a clock recovery system according to claim 1, and a modulator circuit connected to the output of the clock recovery system, and to a source for a data carrying optical signal and arranged to produce a modulated signal substantially aligned to the timing of the clock signal.

14. A regenerator according to claim 13, in which the modulator includes a non-linear optical medium configured to receive the data carrying signal and the clock signal and to amplitude-modulate the clock signal with the data to provide a retimed modulated output signal.

15. A regenerator according to claim 13, in which the modulator circuit comprises:
   a first optical signal path carrying the optical signal;
   a second optical signal path carrying the clock signal output from the clock recovery circuit; and
   a non-linear optical medium connected in common to the first and second optical signal paths, the clock signal pumping the medium thereby cross-phase modulating the optical signal and substantially aligning the timing of the optical signal to the clock signal.

16. A regenerator according to claim 13, in which the non-linear optical medium is a fibre modulator.

17. A regenerator according to claim 16, in which the fibre modulator is configured as a loop mirror.

18. A method of recovering a clock from an optically encoded signal, including the steps of driving an optically controlled optical modulator in a mode-locked laser with the optically encoded signal and thereby generating in the laser a pulse train locked in phase and frequency to a timing wave of the optically encoded signal and outputting the pulse train.

19. A method according to claim 18, further characterised in that the optically controlled optical modulator is a non-linear optical medium connected in common with an optical transmission path of the optically encoded signal and with the laser cavity, and in that the power of the pulses in the laser pulse train is sufficient to modulate in turn the optically encoded signal so as to shift the timing of the pulses making up the signal to align the pulses with the pulse train.

20. A method of regenerating an optical signal comprising recovering a clock by a method according to claim 18, and applying a data carrying signal and the recovered clock to a modulator thereby producing a modulated signal substantially aligned in timing to the clock.

21. A method according to claim 20, including the step of amplitude-modulating the clock with the data carrying signal in the modulator and outputting the modulated clock signal.

22. A method according to claim 20, including the step of cross-phase modulating the data carrying signal and the clock in the modulator and outputting the phase-modulated data carrying signal through a dispersive medium, thereby shifting the timing of the data carrying signal to align it with the clock.

23. A mode-locked laser system comprising:

a fibre laser;

means for pumping the fibre laser;

an optically controlled optical fibre modulator connected in the path of an optical cavity of the fibre laser and connected in common with an optical transmission path for a driving signal; and means for outputting an optical pulse stream from the laser;

wherein the driving signal modulates the phase and/or amplitude of light in the optical path of the laser cavity, thereby mode-locking the laser.

24. A system according to claim 23, further comprising a passive non-linear pulse-shaping element in the optical cavity of the fibre laser.

* * * * *